United States Patent Office 3,642,772
Patented Feb. 15, 1972

3,642,772
PROCESS FOR PREPARING S-ADENOSYL
HOMOCYSTEINE
Erich Haid, Weilheim, and Günter Weimann, Percha, Upper Bavaria, Germany, assignors to Boehringer Mannheim GmbH, Mannheim-Waldhof, Germany
No Drawing. Filed Aug. 29, 1969, Ser. No. 854,315
Claims priority, application Germany, Sept. 4, 1968,
P 17 95 282.8
Int. Cl. C07d 51/54
U.S. Cl. 260—211.5 R                10 Claims

ABSTRACT OF THE DISCLOSURE

Process for preparing S-adenosyl homocysteine by demethylation of S-adenosyl methionine which comprises reactng an S-adenosyl methionine salt in a polar organic solvent therefor with an alkali metal or alkaline earth metal halide or pseudohalide at a temperature of about 10 to 100° C.

---

This invention relates to a method for preparing S-adenosyl homocysteine and more particularly relates to a chemical method of preparing S-adenosyl homocysteine by the demethylation of S-adenosyl methionine.

S-adenosyl-L-homocysteine (SAH) is an important biological intermediate that occurs in all transmethylation reactions in which S-adenosyl methionine (SAM) participates in nature. This methyl group transfer is of fundamental importance to the entire organism (for example in nucleic acid and amino acid metabolism) and is the basis for the considerable interest in the compounds SAM and SAH which participate in these reactions. For example, SAH is a reaction product in the biosyntheses of methionine, choline, metadrenaline, adrenaline, N-methyltetrahydrofolic acid, anserine, L-methylhistamine, N-methylnicotinamide, creatine, spermidine, spermine, and also in the case of a number of alkaloids.

Hitherto SAH has been prepared by chemical synthesis (W. Sakami, Biochem. Prep. vol., 8, 8); by isolation from yeast (Shapiro, Anal. Biochem. 15, 323 (1966)); by enzymatic demethylation of SAM (shapiro et al., J. biol. Chem. 239,1551 (1964)), Haba, Cantoni, J. biol. Chem. 234, 603 (1959) Duerre, Arch. Biochem. Biophys. vol. 96, 570 (1962), or by enzymatic synthesis from adenosine and homocysteine with liver enzyme (Duerre, Schlenk, Arch. Biochem. Biophys., vol. 96, 575 (1962). All of the abovementioned methods, however, are very laborious and furthermore do not provide satisfactory yields. The enzymatic demethylation processes have the disadvantage of the difficult accessibility and instability of the enzymes involved. Up to the present, however SAH has not been commercially available due to the lack of a method of preparation that can be used on a technical scale.

It is therefore an object of this invention to provide a simple and technically feasible method for preparing SAH.

A further object of the invention is to provide a simple and technically feasible method for preparing SAH from the easily available SAM.

The obstacle to the solution of the problem of providing such a method is attributable to the fact that due to the great sensitivity of SAM to chemical agents, the fragmentation reactions, which are otherwise conventionally used in preparative organic chemistry in the case of sulfonium compounds, cannot be applied to the transformation of SAM to SAH (see Houben-Weyl, vol. 9, 175).

It is known that S-adenosyl methionine (SAM; Formula I) is degraded at A, B, C, D, and E, depending on the conditions of the reaction:

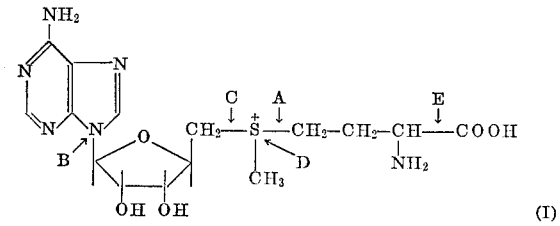

(I)

Bond A is broken preferentially in an acid medium; bonds B, C and E are broken preferentially in an alkaline medium, while the carrying out of reaction D has been possible hitherto enzymatically, but not chemically. S. Schlenk, a pioneer in this field, has stated the following in "The Chemistry of Biological Sulfonium Compounds" ("Fortschritte der chemischorganischen Naturstoffe, vol. 23, 1965, p. 75):

"The bond between the sulfur atom and the methyl group (D in Formula I) is particularly resistant; it has not been possible hitherto to find any conditions of hydrolysis which will lead from S-adenosyl methionine to S-adenosyl homocysteine."

The only method for the conversion of sulfonium salt into sulfides that has been known hitherto (Krollpfeifer, Chem. Berichte, vol. 86, No. 9, p. 1049) and has been described in connection with the special example of the cleavage of diarylalkylsulfonium salts to diarylsulfides, fails completely in the case of SAM to SAH. When alkali chlorides are used in an aqueous medium of SAM at boiling temperature, as described in this process, only methyl adenosylsulfide (MAS) is obtained (by Method A).

Surprisingly, it has now been found in accordance with the invention that under certain conditions, a chemical transformaiton of SAM to SAH is possible, i.e., the cleavage of bond D in Formula I takes place without any substantial amount of cleavage of bonds A, B, C, or E.

The method of the invention for the preparation of S-adenosyl homocysteinine comprises reacting in a polar organic solvent or solvent mixture, an S-adenosyl methionine salt that is soluble therein, with an alkali or alkaline-earth halide or pseudohalide, at a temperature of from about 10 to 100° C.

A particularly suitable polar organic solvent is one that contains oxygen, such as for example, an alcohol that is liquid at the reaction temperature used, a low fatty acid, or a low ketone. Alcohols, ketones and fatty acids having 1 to 4 carbon atoms are preferably used. Methanol is especially preferred. The solvent that is used must be substantially water-free. Preferably, any water that may be present is distilled off with the formation of a suitable azeotrope, after the SAM salt has been dissolved therein. For example, when methanol is used as the solvent, an azeotrope water-methanol-benzene is suitable for this purpose. At least one polar organic solvent is used in the process of the invention.

The type of SAM salt used depends on the solvent, as the various SAM salts each have different solubilities in the different organic solvents. Instances of SAM salts that are suitable for use in the invention are the formate, acetate, perchlorate, chloride, bromide and iodide salts. The iodide and chloride salts are preferred because of their excellent solubility characteristics.

The SAM salts does not have to be in pure form. For example, crude commercial SAM salt having a SAM content of about 20 to 25% is suitable for the process of the invention. As commercial SAM salt is often a sulfate which does not have the desired solubility, it is advantageous to first carry out an anion exchange by reaction with a suitable barium salt, such as barium iodide. The barium sulfate that is formed in this reaction can thereafter be easily separated off.

Alkali metal or alkaline earth metal halides or pseudohalides that are suitable for use as demethylating agents in the process of the invention include for example, the salts of lithium, sodium, potassium, ammonium, magnesium, calcium, strontium and barium, formed with halide anions such as chloride, bromide or iodide, or pseudohalide ions such as rhodanide. The iodides are preferred, because, on the one hand they have a good organosolubility, and on the other hand they are particularly well suited for the demethylation process.

The halide or pseudohalide is employed in quantities that are at least equimolar to the SAM salt used in the reaction, though it is preferably used in an excess. Suitable molar ratios of SAM to halide amount to between about 1 and 10; preferably, the halide is used with a 1-molar excess. For example, in the case of barium iodide, it is possible to carry out the conversion of SAM sulfate to SAM iodide and the reaction with the alkaline earth halide in a one-step reaction.

The reaction, according to the invention, as already mentioned, takes place at a satisfactory velocity; at a temperature of from 10 to 100° C. If an alkali or alkaline earth iodide is used, the reaction is carried out at a temperature of between 45 and 55° C., as at this temperature the methyl iodide that forms is distilled off and the reaction equilibrium is constantly shifted in the SAH direction. The reaction time, at a temperature of 50° C., amounts to about 24 hours for complete reaction to take place, i.e., SAM is no longer detectable. A quantity of MAS and homocysteine is formed as a by-product (cleavage at A in Formula I). At lower temperature, less by-products are formed, though the reaction takes place very slowly. At higher temperature the reaction speed is increased, but the formation of by-products is also increased considerably.

The recovery of pure SAH from the solution produced in the process of the invention is advantageously carried out in a simple manner by adsorption onto active carbon followed by desorption with an alkaline solution of water and alcohol. The use of a carbon column has been found to be particularly suitable for this procedure. SAH crystallizes from the eluate at a neutral pH, if allowed to stand at low temperature.

The process of the invention can be carried out in a simple manner, without any special expense for apparatus. The yields are very satisfactory and amount to 80% or more of the SAM introduced.

The following are examples given for further illustrating the invention and are in nowise to be construed as a limitation of the scope thereof.

EXAMPLE 1

200 g. of crude SAM.HSO$_4$ (SAM content about 20 to 25%) were dissolved in 500 ml. of distilled water, and a concentrated aqueous solution of 200 g. of barium iodide then added. The barium sulfate precipitate which settled out was centrifuged off, washed once with distilled water, and again centrifuged. The remaining liquids were combined, concentrated in vacuo to an oily consistency, and poured with thorough stirring into a mixture of 2.5 l. of methanol and 500 ml. of benzene. Without removing the precipitate which thereby formed, the suspension was concentrated in vacuo to about 2 l., and the concentrate diluted to 3 liters with absolute methanol. The yellowish solution thusly produced was maintained by water bath for 24 hours at 50° C., cooled to room temperature, chromatographed through a carbon column (length 1.2 m., diam. 4 cm.) and washed with 4 liters of distilled water.

The absorbed SAH was eluted from the carbon column with a mixture of ethanol, water and concentrated ammonia (50:50:1). The fractions which had an absorption at 260 m$\mu$ in ultraviolet light were collected and concentrated in vacuo to about 200 to 300 milliliters. The pH of the concentrate was adjusted with acetic acid to 7. The SAH was then crystallized out at 0° C. After 2 days the crystalline SAH was suction filtered, washed with a little ice-cold water and recrystallized from hot distilled water.

Yield: 30 to 35 g. SAH.2H$_2$O (60 to 71% of the theory with reference to the SAM introduced).

EXAMPLE 2

200 g. of crude SAM.HSO$_4$ were dissolved in 500 ml. of formic acid, and a solution of 150 g. NaI in 2.5 l. of methanol then added thereto. Without removing the precipitate, the suspension was incubated for 24 hours at 50° C. and further processed as described in Example 1.

Yield: 30 to 35 g. as dihydrate.

EXAMPLE 3

10 kg. of yeast enriched with SAM as described by Schlenk et al. in Enzymologia, 29, 283 (1965) and disintegrated by perchloric acid are separated from the yeast residue by centrifugation. The SAM-containing supernatant is neutralized with potassium hydroxide solution up to a pH-value of 3.5 and separated by filtration from the out-crystallized KClO$_4$ at a temperature of +4° C. A concentrated aqueous solution of 50 g. of picric acid and 50 g. of sodium picrate is added with stirring into the filtrate. After 15 to 20 hours the precipitated SAM picrate is filtrated off at a temperature from 0 to +4° C. and is washed with slightly saturated solution of picric acid. The picrate precipitation is dissolved in a mixture of 50% of acetone and 50% of 0.3 M hydrochloric acid and poured into a five times bigger acetone volume. The precipitation is centrifuged off, washed with acetone and without drying suspended in absolute methanol. The pH-value is adjusted to between 2 and 2.5 by adding methanolic hydrochloric acid and a sometimes remaining undissolved gelatinous residue is separated. Approximately 50 g. of sodium iodide are dissolved in the clear, yellowish solution and are incubated for about 24 hours at +50° C. (Acetone and hydrochloric acid contained in the incubation solution are advantageous for the transformation of SAM to SAH.) After neutralization to pH 5 the SAH solution is concentrated to 500 ml., diluted with H$_2$O to approximately 2 l. and the SAH is adsorbed at a carbon column of 2 l. After the washing of the carbon column with 2 l. of distilled water the elution is carried out with acetone:H$_2$O:concentrated ammonia=50:50:1. The SAH-containing eluates are concentrated to about 200 ml. and the SAH is crystallized at a temperature of +4° C., filtrated off and subsequently recrystallized from hot distilled water.

Yield: 23 to 25 g. SAH·2H$_2$O (70–76% of the theory with reference to the SAM content in the disintegrated yeast).

What is claimed is:

1. Process of preparing S-adenosyl homocysteine by demethylation of S-adenosyl methionine which comprises reacting an S-adenosyl methionine salt, said salt being selected from the group consisting of formate, acetate, perchlorate, chloride, bromide and iodide, in the form of its solution in at least one polar organic solvent with a member selected from the group consisting of alkali metal and alkaline earth metal halides and pseudohalides, at a temperature of from about 10 to 100° C.

2. Method according to claim 1 wherein said polar organic solvent is a member selected from the group consisting of lower alcohols, lower fatty acids and lower ketones.

3. Method according to claim 2 wherein said polar organic solvent contains up to 4 carbon atoms.

4. Method according to claim 2 wherein said polar organic solvent is methanol.

5. Method according to claim 1 wherein said S-adenosyl methionine salt is a member selected from the group consisting of chloride and iodide salts.

6. Method according to claim 1 wherein said halide group member is a halide of a metal selected from the group consisting of lithium, sodium, potassium, ammonium, magnesium, calcium, strontium and barium.

7. Method according to claim 1 wherein said halide group member is an iodide.

8. Method according to claim 1 wherein said reaction is carried out at a temperature of from 45 to 55° C.

9. Method according to claim 1 wherein said S-adenosyl methionine salt and halide group member are used in a ratio of 1:1 to 1:10.

10. Method according to claim 1 wherein said S-adenosyl methionine salt and halide group member are used in a ratio of 1:2.

References Cited
UNITED STATES PATENTS 2,969,353    1/1961    Shunk et al.    260—211.5

LEWIS GOTTS, Primary Examiner

J. R. BROWN, Assistant Examiner